United States Patent [19]

Arimoto et al.

[11] Patent Number: 5,233,188
[45] Date of Patent: Aug. 3, 1993

[54] LASER BEAM SCANNING APPARATUS FOR SCANNING A LASER BEAM OBTAINED BY COMPOSING A PLURALITY OF BEAMS

[75] Inventors: Akira Arimoto, Kodaira; Susumu Saito, Hachioji; Takeshi Mochizuki, Mito, all of Japan

[73] Assignees: Hitachi, Ltd.; Hitachi Koki Co., Ltd., both of Tokyo, Japan

[21] Appl. No.: 737,660

[22] Filed: Jul. 30, 1991

Related U.S. Application Data

[63] Continuation-in-part of Ser. No. 501,879, Mar. 30, 1990, Pat. No. 5,053,619.

[30] Foreign Application Priority Data

Apr. 3, 1989 [JP] Japan .................. 1-081392
Jul. 30, 1990 [JP] Japan .................. 2-201649

[51] Int. Cl.$^5$ ............................... H01J 3/14
[52] U.S. Cl. .................. 250/235; 250/225; 359/214
[58] Field of Search .......... 250/235, 236, 225; 346/108, 160; 358/493-494, 481; 359/214-219

[56] References Cited

U.S. PATENT DOCUMENTS

| | | | |
|---|---|---|---|
| 4,525,024 | 6/1985 | Tatsuno et al. | 359/218 |
| 4,760,407 | 7/1988 | Arimoto et al. | 346/108 |
| 4,796,961 | 1/1989 | Yamada et al. | 359/218 |
| 5,066,962 | 11/1991 | Sarraf | 346/108 |
| 5,097,351 | 3/1992 | Kramer | 359/214 |

OTHER PUBLICATIONS

"Principle of Optics", 4th Edition, 1976, McGraw-Hill, p. 535.

Primary Examiner—David C. Nelms
Assistant Examiner—Stephone Allen
Attorney, Agent, or Firm—Fay, Sharpe, Beall, Fagan, Minnich & McKee

[57] ABSTRACT

In a laser beam scanning apparatus, first and second laser beam emitters emit a laser beam polarized in a specific direction and a laser beam polarized in the direction orthogonal with this specific direction. A prism passes a laser beam emitted from the first laser beam emitter but reflects a laser beam emitted from the second laser beam emitter, and amalgamates two laser beams emitted from the first and second laser beam emitters in almost the same direction. A rotating polygonal mirror and a scanning lens simultaneously scan on a scanned plane two laser beams amalgamated by the prism. A ¼ wavelength plate is inserted between the rotating polygonal mirror and the prism to change the laser beam from the prism from a linearly polarized state to a circularly polarized state. By the above arrangement, a difference of reflection factors between two laser beams incident to the rotating polygonal mirror can be eliminated so that two uniform laser beams can be scanned at the same time.

6 Claims, 9 Drawing Sheets

F I G. 5
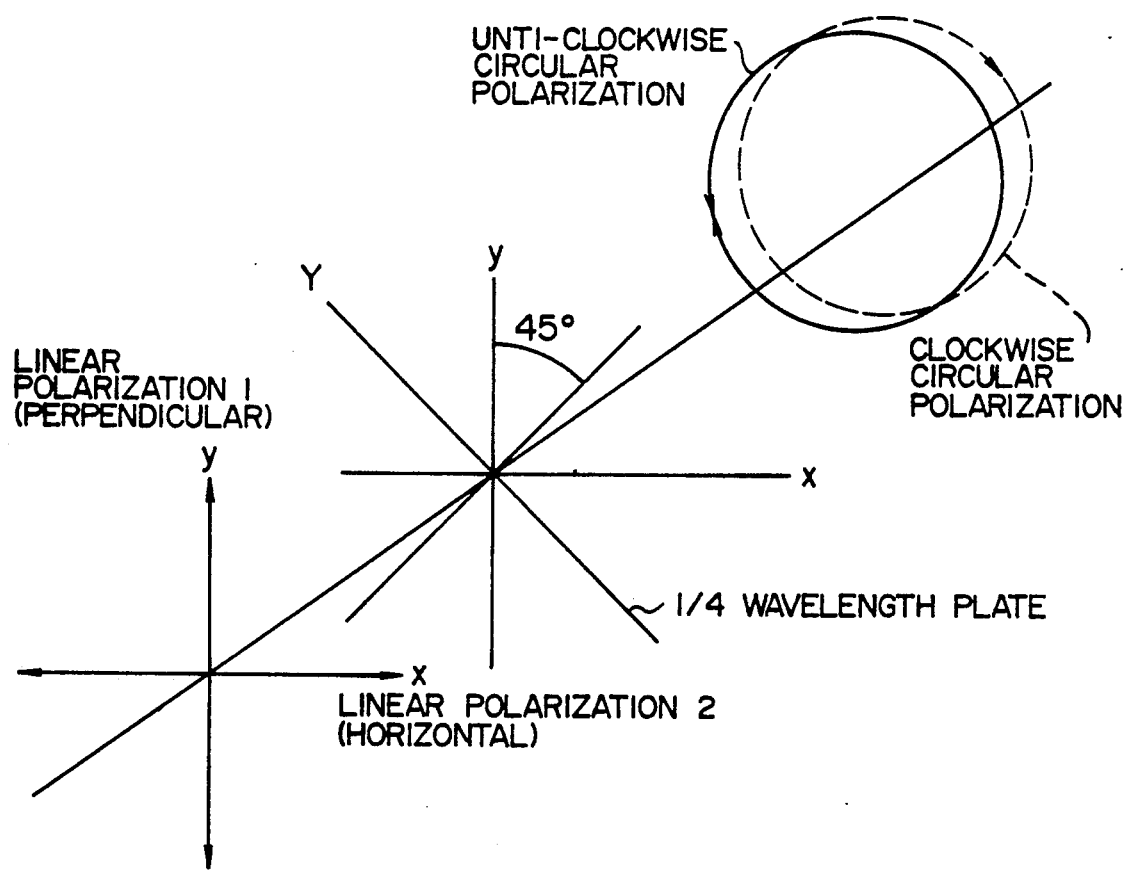

LASER BEAM SCANNING APPARATUS FOR SCANNING A LASER BEAM OBTAINED BY COMPOSING A PLURALITY OF BEAMS

CROSS REFERENCE TO RELATED APPLICATION

This application is a continuation-in-part of our co-pending application Ser. No. 07/501,879, filed, on Mar. 30, 1990, now U.S. Pat. No. 5,053,619.

BACKGROUND OF THE INVENTION

The present invention relates to a laser beam scanning apparatus which scans a laser beam in one dimension, and, more particularly to a laser beam scanning apparatus which is effective in scanning a plurality of laser beams at the same time.

It has been known that a conventional laser printer scans one laser beam with a rotating polygonal mirror. However, following the recent requirement for high-speed operation and the recent application of a semiconductor laser array, printers for simultaneously scanning a plurality of laser beams have been developed.

Since an array using a semiconductor laser has a light emitting point size from 1 $\mu\phi$ to 3 $\mu\phi$, it is necessary that a fine-turned array is prepared and the distance between semiconductor lasers is set at 1 $\mu\phi$ to 3 $\mu\phi$ in order to carry out an elaborate beam scanning. Narrowing the distance between semiconductor lasers, however, results in a heated crosstalk, which is not desirable.

A plurality of lasers are used as an alternative method to avoid the above problem. According to this method, two laser beam sources each having a linear polarization characteristic are amalgamated in approximately the same direction, as disclosed in U.S. Pat. No. 4525024, for example. In this patent application, an optical device (a polarization prism) is proposed which passes a specific linearly polarized light beam (P polarized light beam) but reflects a linearly polarized light beam (S polarized light beam) which vibrates in a plane that is orthogonal with this specific linearly polarized light beam. As shown in FIG. 2, a P polarized beam 100P and an S polarized beam 100S are introduced into a polarization prism 100 PBS and the two beams are output in the same direction, so that the two beams can be utilized effectively.

There have been attempts to compose a laser printer by using a beam amalgamating apparatus as described above. For example, there is an example in which laser beams obtained in the same direction are scanned simultaneously so that the power of laser and the number of revolutions of a rotating polygonal mirror are halved (the preparatory paper for the lecture meeting of the Japan Society of Applied Physics in Autumn of 1985, 3P-H-9, pp 63).

FIG. 3 shows an optical apparatus having the above-described structure. Two laser beams $6_P$ and $6_S$ emitted from two semiconductor laser $5_{1P}$ and $5_{1S}$ are set to be orthogonal with each other at their polarized surfaces, and these two laser beams are amalgamated together in the same direction by a polarization prism 3 so that the two laser beams are scanned simultaneously.

In this case, in order to maintain the spot distance obtained from the two lasers in a sub-scanning direction at a predetermined value, parts of the beams are introduced into a beam detector for detecting the spot distance so that the spot distance is controlled. The control of the spot distance is carried out by using a control circuit 16 which drives galvanomirrors $17_1$ and $17_2$.

In the above-described technique, polarization directions of the amalgamated laser beams are orthogonal with each other. It is known that when laser beams having polarized light beams which are orthogonal with each other are reflected on a metal reflection surface, reflection factors are different depending on the difference of polarization directions. The difference of reflection factors necessarily occurs from the difference of boundary conditions at a boundary surface of electromagnetic waves when the equation of Maxwell is solved, assuming a beam is an electromagnetic wave. For example, the "Principle of Optics" by Jenkins and White (McGraw Hill, the fourth edition, 1976, pp. 535) shows a difference of reflection factors between gold and silver due to a difference of polarization directions (reference FIG. 4).

Usually, an angle of incidence of 30° to 70° is necessary in a laser scanning optical apparatus, and the difference of reflection factors between the two laser beams $6_P$ and $6_S$ is a problem as illustrated in FIG. 4. Such a difference of reflection factors occurs on a reflection surface of a rotating polygonal mirror formed by a general aluminum material as well as on a multi-layer reflection film having multiple layers of dielectrics. In other words, in an optical apparatus for a laser printer using two laser beams as shown in FIG. 3, the polarized beams of laser beams after they have been amalgamated are mutually orthogonal with each other, and when the laser beams are incident directly to the rotating polygonal mirror, the above-described difference of reflection factors occurs.

SUMMARY OF THE INVENTION

In light of the above-described problem of the prior-art, and in order to eliminate this problem, it is an object of the present invention to provide a laser beam scanning apparatus which can obtain an amalgamated laser beam of a uniform intensity by eliminating a difference of reflection factors between two amalgamated laser beam, which difference occurs when these laser beams are introduced to a rotating polygonal mirror.

In a laser optical scanning apparatus including two semiconductor laser beam sources of approximately the same wavelength, a scanning lens and a rotating polygonal mirror, the object of the present invention is achieved by providing said laser beam scanning apparatus with a prism which amalgamates two laser beams from the two semiconductor laser beam sources in approximately the same direction, which has such characteristics that it passes a laser beam polarized in a specific direction but reflects a laser beam polarized in a direction to be orthogonal with this laser beam of the specific direction, and a ¼ wavelength plate inserted between this prism and the rotating polygonal mirror.

In the laser beam scanning apparatus relating to the present invention, a ¼ wavelength plate is inserted between the prism and the rotating polygonal mirror, as described above. As a result, the deviation of the polarization direction at the rotating polygonal mirror at the time of the incidence of the beams is cancelled by setting the polarization state of the amalgamated laser beams in a circularly polarized state. Accordingly, the difference of reflection factors which occurs at the time of incidence of the laser beams to the rotating polygonal mirror is eliminated so that an amalgamated laser beam having a uniform intensity can be obtained.

The principle of the present invention will be described below.

As shown in FIG. 5, consider the case that two mutually orthogonal linearly polarized light beams are incident to a ¼ wavelength plate. An incident beam 1 (a polarized light beam in a perpendicular direction) has a vibration vector axis on $$Y = X$$

Therefore, the incident beam 1 can be expressed by the following:

$$Y = a \sin \omega t$$

$$X = a \sin \omega t$$

On the other hand, an incident beam 2 (a polarized light beam in a perpendicular direction) has a vibration vector axis on $$Y = -X$$

Therefore, the incident beam 2 can be expressed by the following:

$$Y = a \sin \omega t$$

$$X = -a \sin \omega t$$

When a phase of 90° in the direction of X is applied to the ¼ wavelength plate, the incident beam 1 is expressed by the following:

$$Y = a \sin \omega t$$

$$X = a \sin (\omega t + 90°)$$

$$= a \cos \omega t$$

$$X^2 + Y^2 = a^2$$

Accordingly, the incident beam 1 becomes a circularly polarized with an anti-clockwise vector direction. On the other hand, the incident beam 2 is expressed by the following:

$$Y = a \sin \omega t$$

$$X = -a \cos \omega t$$

$$X^2 + Y^2 = a^2$$

Accordingly, the incident beam 2 becomes circularly polarized with a clockwise vector direction.

Usually, there is no difference in reflection factors due to the difference in the directions of vector rotation of polarized light beams, except for a substance which has a magnetic optical effect. In other words, the component of a circular polarization is the same for the X direction and the Y direction, so that two circularly polarized light beams can be considered to have the same component as those of linearly polarized light beams, respectively. Accordingly, even if the rotation directions of the two polarized light beams are different, there is no difference between the reflection factors on the mirror. When a ¼ wavelength plate is provided as described above, linearly polarized light beams are converted into circularly polarized light beams so that the difference between reflection factors is eliminated and two equal scanning lines can be obtained.

BRIEF DESCRIPTION OF THE DRAWINGS

FIG. 5 explains an effect which is obtained by inserting a ¼ wavelength plate.

DESCRIPTION OF THE PREFERRED EMBODIMENTS

Embodiments of the present invention will be explained in detail with reference to the drawings.

Figure 1:
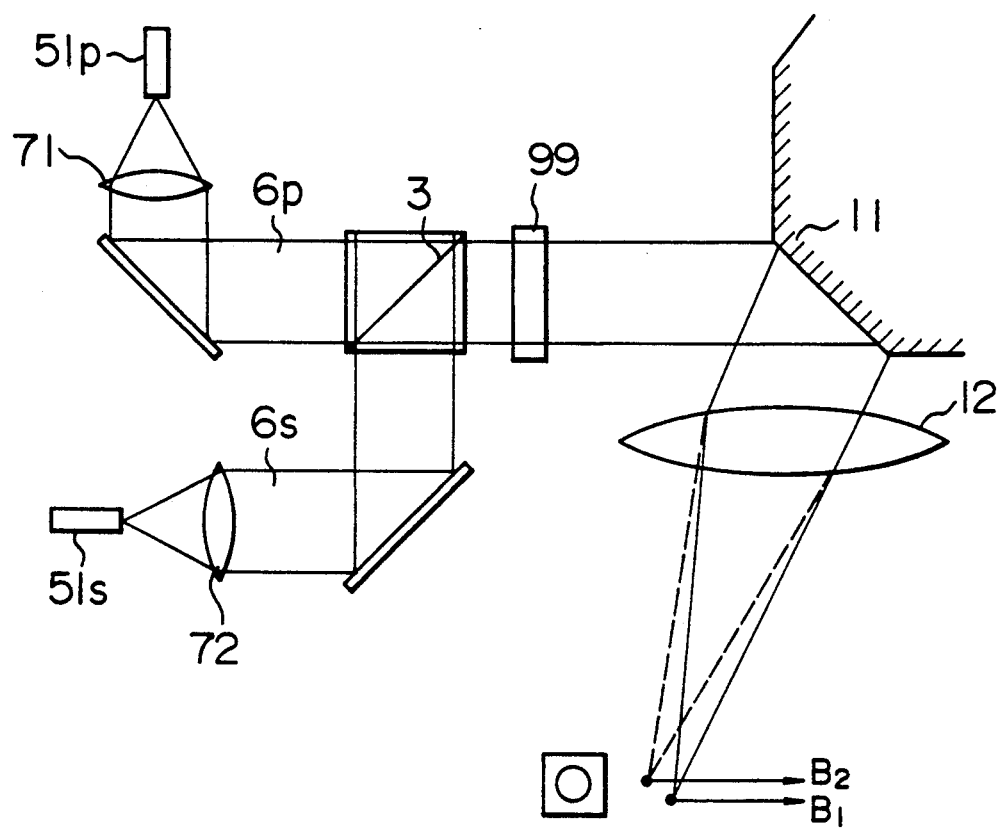
FIG. 1 shows key portions of the laser beam scanning apparatus relating to a first embodiment of the present invention.
Figure 2:
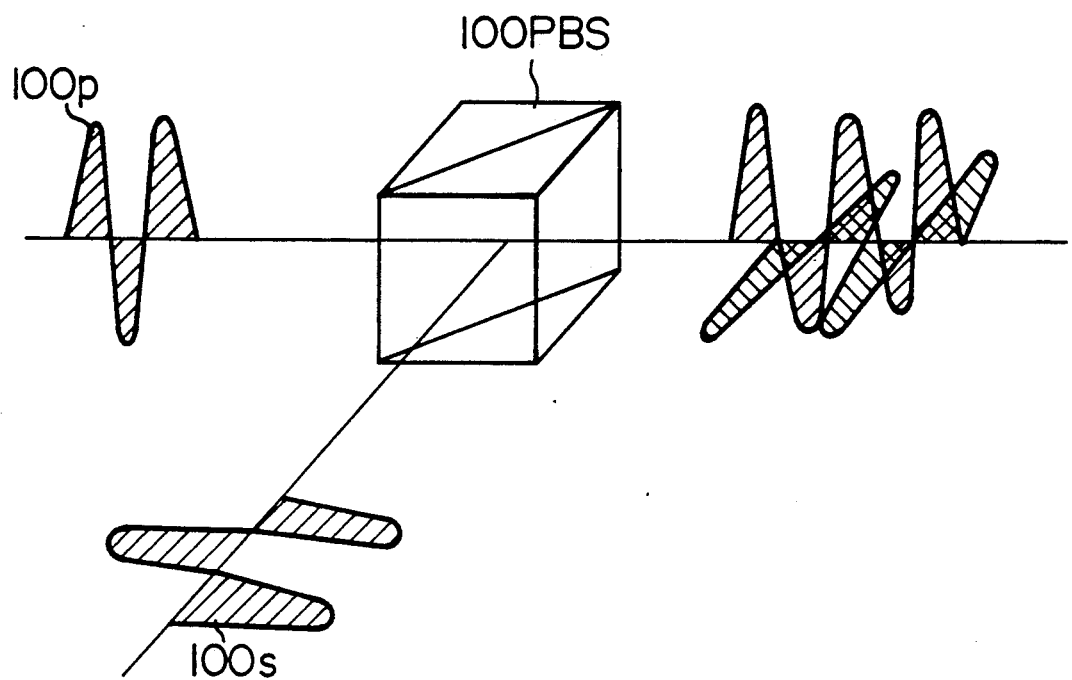
FIG. 2 shows a principle for amalgamating laser beams by utilizing polarized light beams.

FIG. 1 shows key portions of the laser beam scanning apparatus relating to the first embodiment of the present invention. In FIG. 1, reference numbers 3, $5_{1P}$, $5_{1S}$, $6_P$, $6_S$, $7_1$, $7_2$, 11 and 12 show the same configuration elements as those shown in FIG. 3.

In the first embodiment, two laser beams $6_P$ and $6_S$ emitted from the two semiconductor lasers $5_{1P}$ and $5_{1S}$ are orthogonal with each other at their polarized surfaces and the two laser beams are amalgamated in the same direction by the polarization prism 3. The above-described ¼ wavelength plate 99 is inserted into the light path of the amalgamated laser beams so that the polarization of the laser beams is converted into a circular polarization. The laser beams which have been converted into circularly polarized light beams are guided to the rotating polygonal mirror 11 and the two laser beams are scanned on a photosensitive drum (not shown) through a scanning lens 12.

Since two circularly polarized light beams are incident to the rotating polygonal mirror 11 in the first embodiment, there occurs no difference of reflection factors due to the difference in polarization directions, and scanning lines of the same intensity can be drawn on the photosensitive drum.

Figure 3:
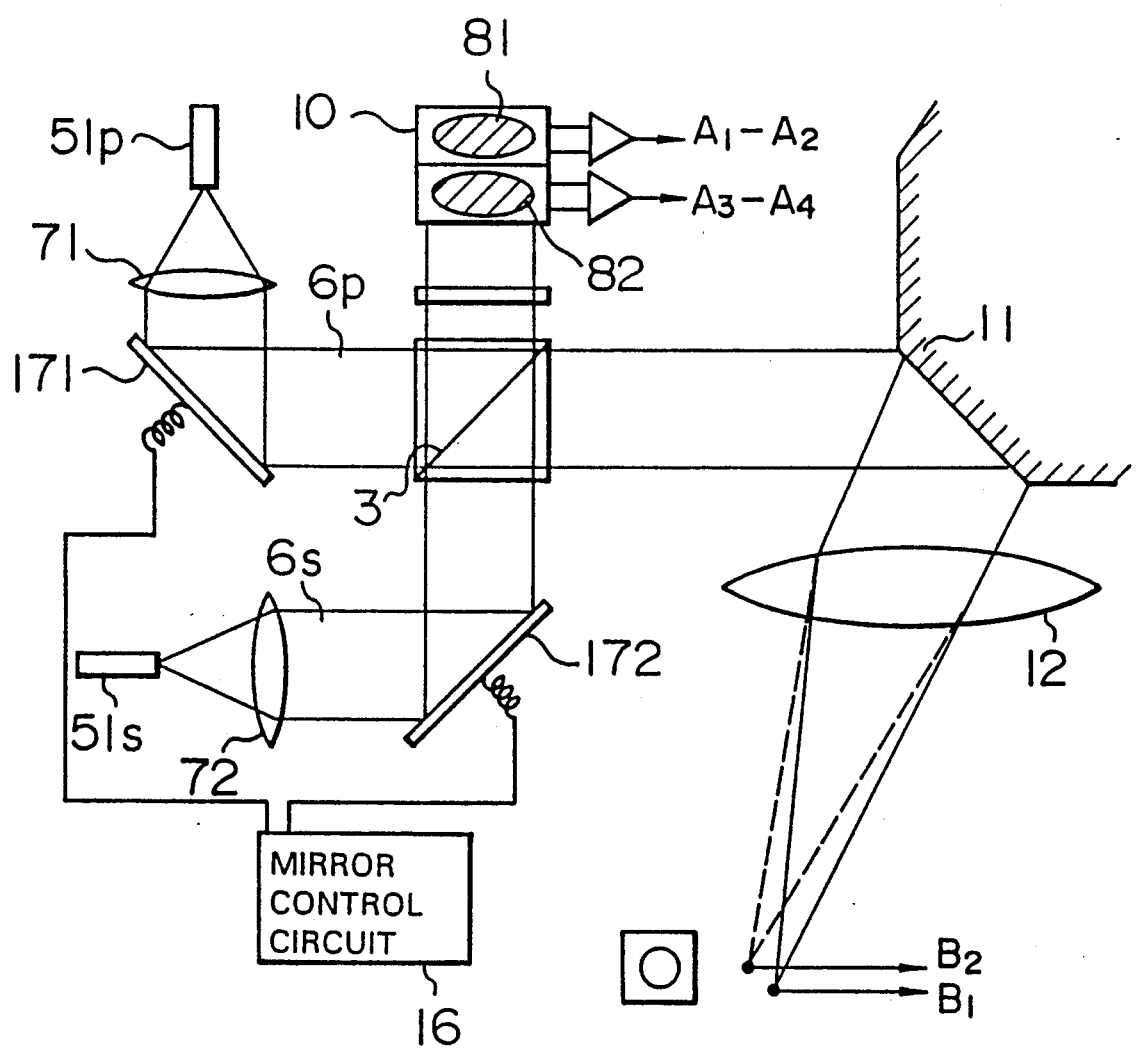
FIG. 3 shows a conventional configuration controlling a laser printer scanning line interval in a sub-scanning direction.
Figure 4:
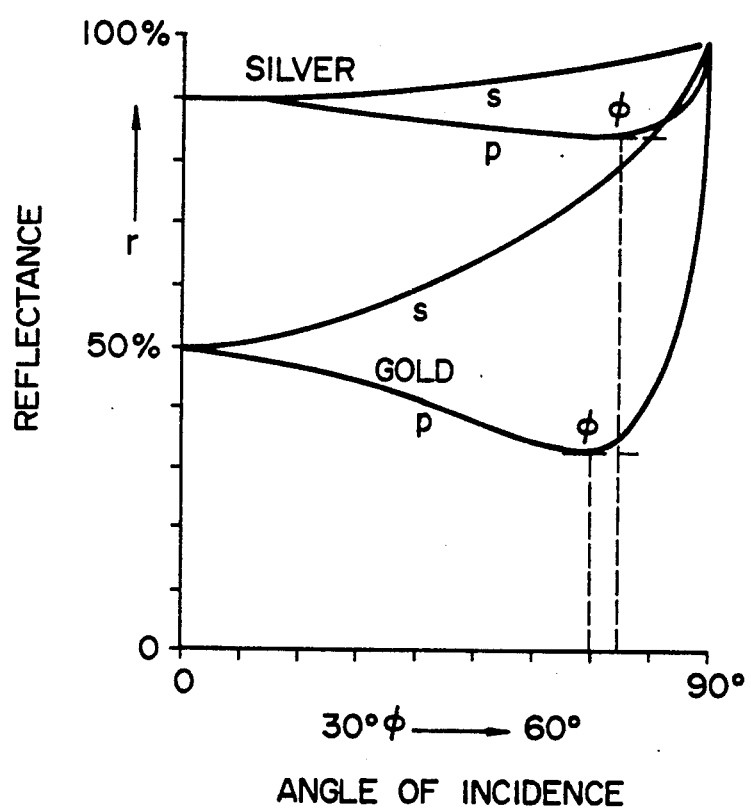
FIG. 4 shows a difference of reflection factors due to polarization on the reflection surface.
Figure 6:
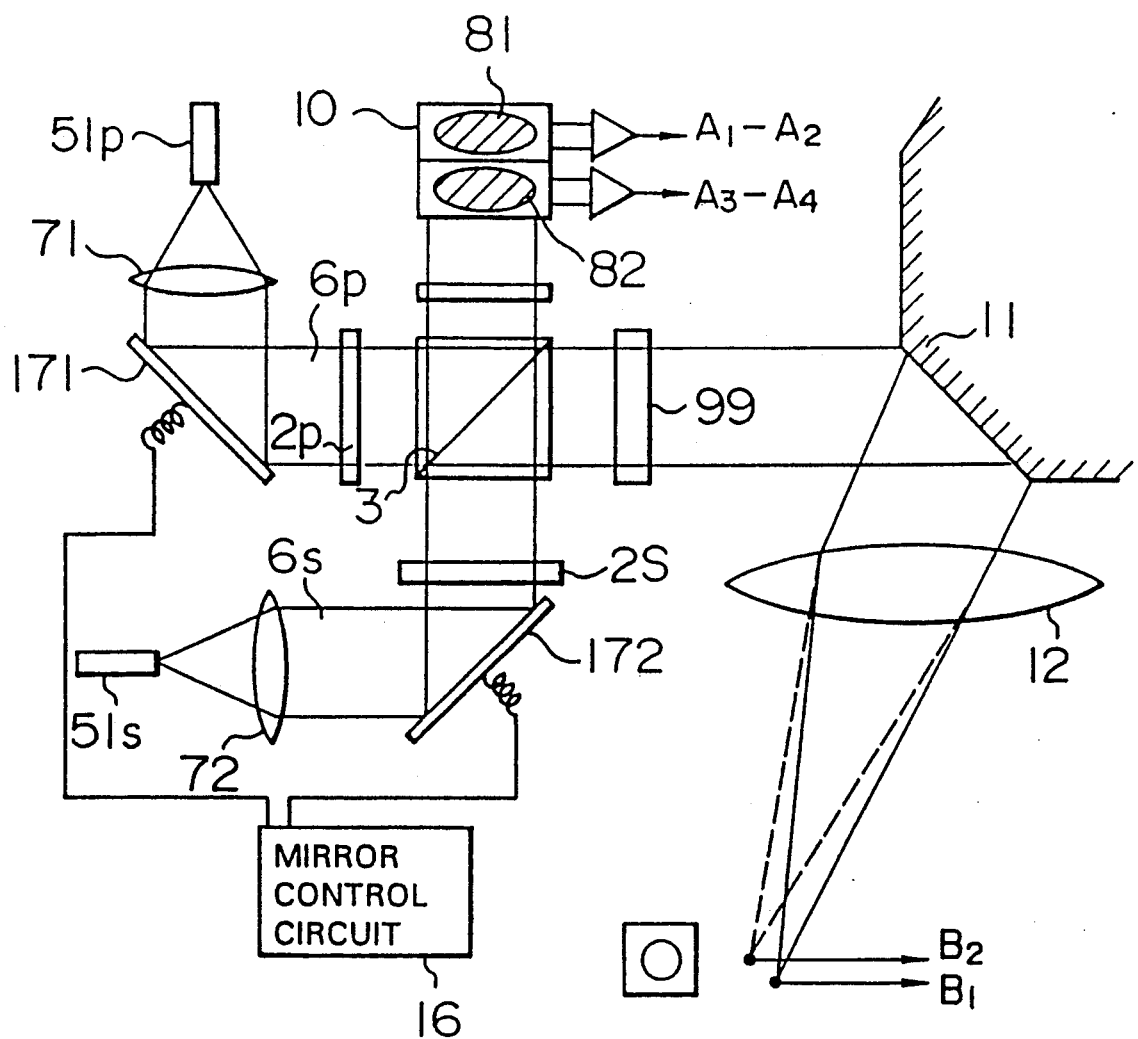
FIG. 6 shows key portions of the laser beam scanning apparatus relating to a second embodiment of the present invention.

FIG. 6 shows key portions of the laser beam scanning apparatus relating to the second embodiment of the present invention. In FIG. 6, reference numbers 3, $5_{1P}$, $5_{1S}$, $6_P$, $6_S$, $7_1$, $7_2$, 11, 12 and 99 show the same configuration elements as shown in FIG. 1. Reference numerals $8_1$, $8_2$, 10, 16, $17_1$ and $17_2$ show the same configuration elements as shown in FIG. 3.

In the second embodiment, correction means for controlling the distance in the sub-scanning direction of two laser beams is added to the laser beam scanning apparatus shown in the first embodiment. The correction means for controlling the distance in the sub-scanning directions can be replaced by the correction means shown in FIG. 3.

In order to always observe the distance of the sub-scanning directions of the laser beams, parts of each laser beam are guided to the light detector 10 which detects a spot distance. The quantity of the parts of each laser beam to be guided to the light detector 10 is generally about 5% of the total beam quantity. It is convenient to adjust the quantity of the beam to be introduced to the light detector 10 at the time of adjusting, in order to stabilize the operation of the negative feedback control unit which includes a galvano-mirror that is operated based on the above-described light quantity. For this purpose, the directions of the laser beams may be rotated to rotate the polarization surfaces of the laser beams that are incident to the prism 3. There is an advantage of having no difference in the light collecting spot diameter if the light emitting angles of the laser beams are set to be the same even if the polarized beams of the two amalgamated laser beams are crossed with each other, instead of changing the directions of the laser beams.

For the above reason, in the second embodiment, $\frac{1}{2}$ wavelength plates, each of which changes only the direction of the polarization by keeping the polarization in a state of linear polarization, are inserted between each laser and the prism 3. It is well known that the polarization direction after passing the polarized light beams can be changed freely if the setting angle is selected suitably by inserting the $\frac{1}{2}$ wavelength plates (reference, for example, "Crystal Optics" by Ishiguro et al, Optical Meeting of the Japan Society of Applied Physics, published by Morikita Publication).

Figure 7:
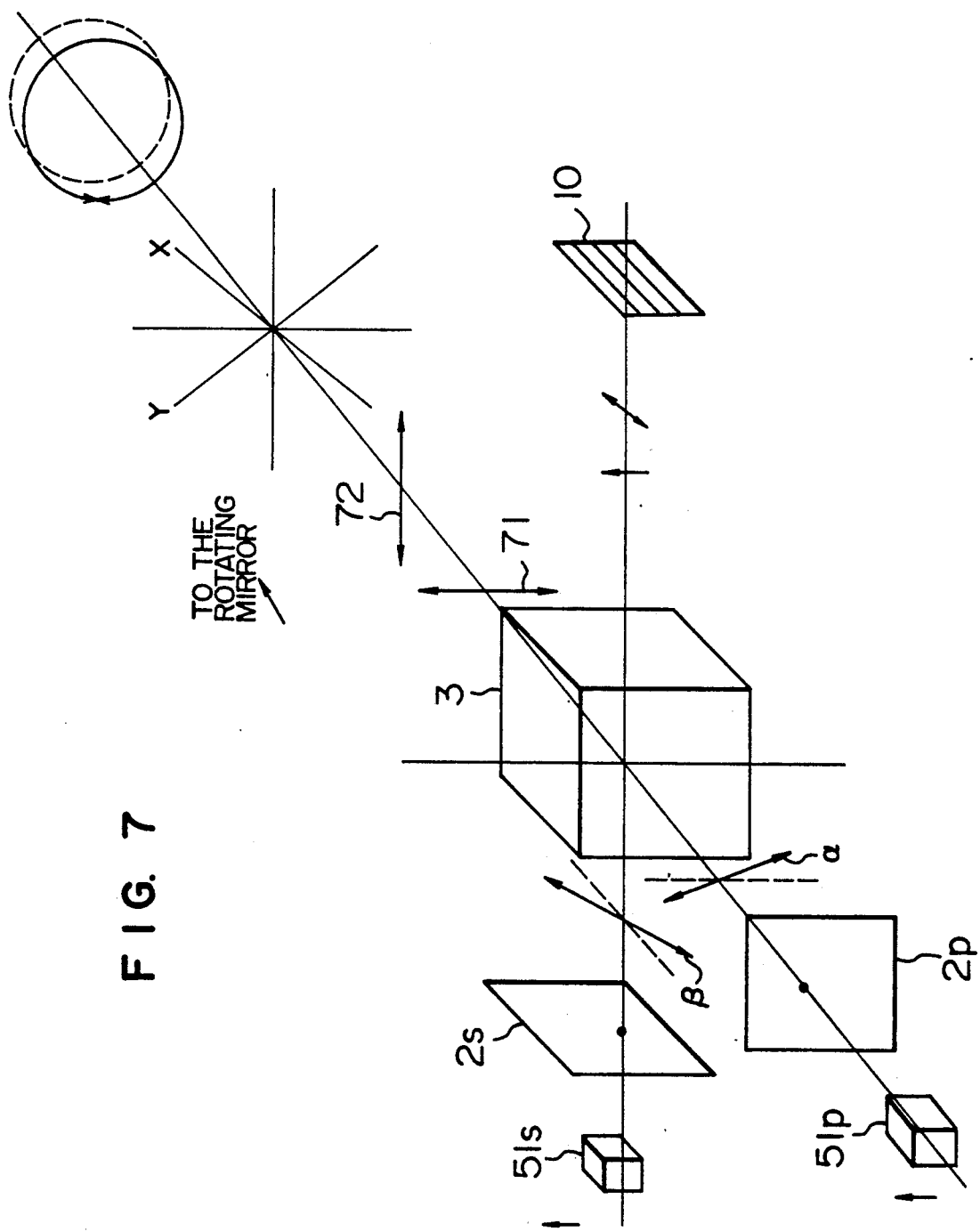
FIG. 7 shows a principle of the apparatus of FIG. 6.

Accordingly, the provision of the above-described $\frac{1}{4}$ wavelength plate after the amalgamating of the laser beams and the provision of the $\frac{1}{2}$ wavelength plates make it possible to adjust the light quantity of the light detector for controlling the distance of the sub-scanning directions and to make approximately equal the intensities of the two laser beams on the photosensitive drum surface. The above principle will be explained with reference to FIG. 7.

For example, two semiconductor laser beams are set as linearly polarized light beams which vibrate mutually in perpendicular directions. The $\frac{1}{2}$ wavelength plate $2_P$ sets the beam emitted from the semiconductor laser $5_{1P}$ as a linearly polarized light beam which is inclined from the perpendicular direction by an angle of $\alpha$. On the other hand, the $\frac{1}{2}$ wavelength plate $2_S$ sets the beam emitted from the semiconductor laser $5_{1S}$ as a linearly polarized light beam which is inclined from the horizontal direction by an angle of $\beta$. In this case, the prism 3 for amalgamating the beams passes the perpendicular linearly polarized light beam by almost 100% and reflects the horizontal linearly polarized light beam by almost 100%. Accordingly, intensities of the laser beams 71 and 72 which are directed to the rotating polygonal mirror after the polarized light beams have been amalgamated become $a^2 \cos \alpha^2$ and $a^2 \cos \beta^2$ respectively, where a is an amplitude intensity of the laser, and $\cos \alpha = \cos \beta = 1$ when $\alpha << 1$ and $\beta << 1$, so that the intensities after the amalgamating of the beams are approximately equal.

In the mean time, the quantities of beams directed to the light detector 10 become $a^2 \sin \alpha^2$ and $a^2 \sin \beta^2$ respectively so that the intensities are approximately proportional to fine variations of $\alpha$ and $\beta$. Accordingly, it becomes possible to adjust fine quantities of beams directed to the light detector 10. The laser beams directed to the rotating polygonal mirror after they have been amalgamated are polarized. in mutually crossed directions at first. However, the crossed laser beams become mutually circularly polarized light beams after passing the $\frac{1}{4}$ wavelength plate, so that the transmission intensities of the beams are not changed substantially even after passing through the rotating polygonal mirror and an FO (scanning) lens.

According to the above-described embodiment, it is possible to realize a laser beam scanning apparatus which can easily control the sub-scanning directions and which does not generate a difference in the intensities between two scanning beams.

The laser printer to which the present invention is applied will be explained next. The present laser printer can not only change the distance of the sub-scanning direction of the scanning laser beams, but also can change the spot diameter of the sub-scanning direction of each scanning beam.

Figure 8:
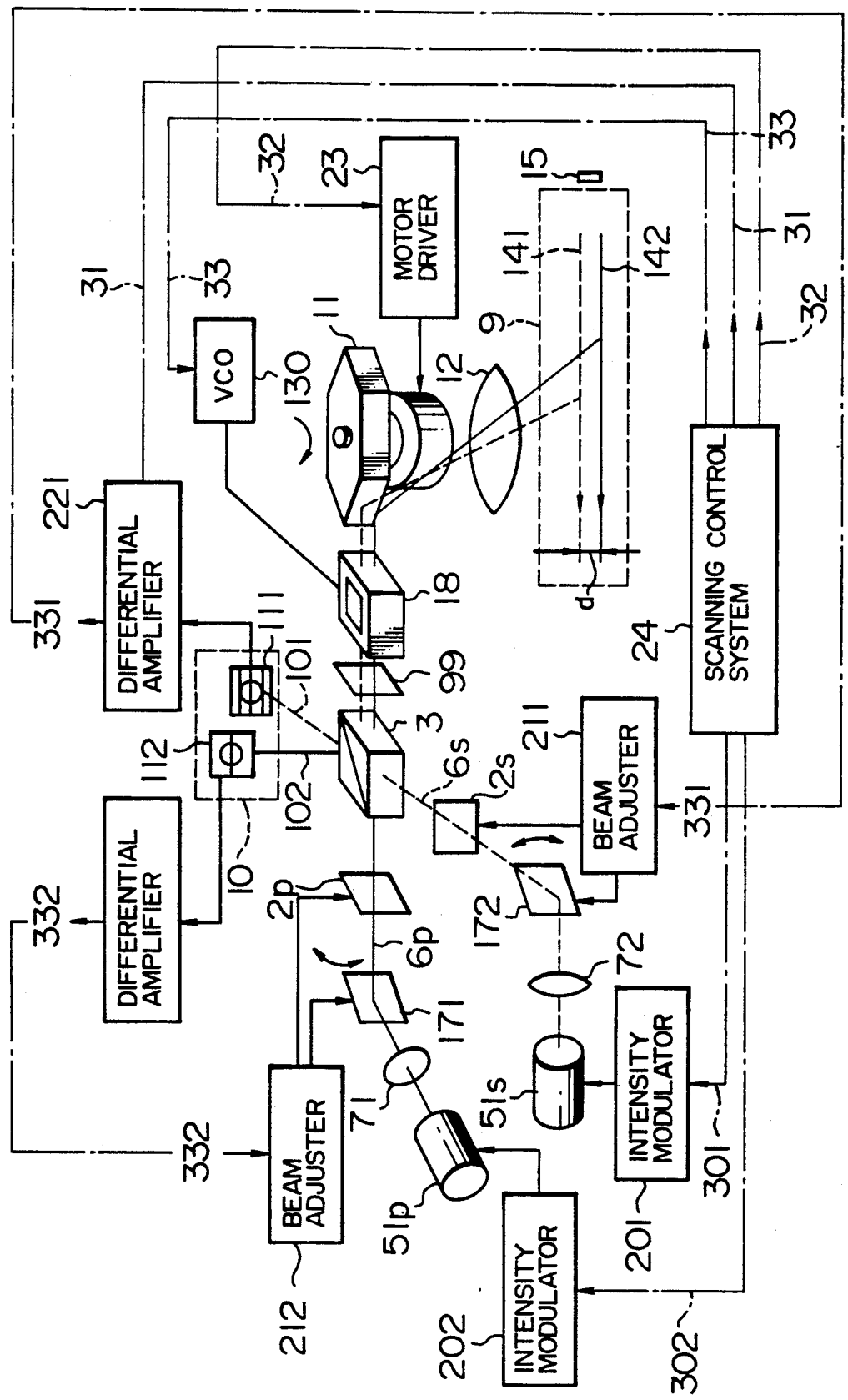
FIG. 8 shows an overall configuration of the laser printer to which the present invention is applied.

FIG. 8 shows a configuration of the entire laser printer. Two light sources $5_{1P}$ and $5_{1S}$ emitting linearly polarized light beams are used with the polarization direction of each light beam virtually put in orthogonal arrangement with respect to each other (P and S polarization). Beams $5_{1P}$ and $5_{1S}$ emitted from the light sources $5_{1P}$ and $5_{1S}$ are led into a polarization beam splitter 3 through lenses 71 and 72 and beam path adjusters 211 and 212 (which adjust the optical paths, for example, through such mechanism as rotary drive members attached to mirrors $17_1$ and $17_2$ driven by outputs 331 and 332 of differential amplifiers 221 and 222).

The beam splitter 3 performs a function of allowing the P-polarized light to go straight on and to deflect the S-polarized light through a right angle, and hence, the beams $6_P$ and $6_S$, after passing through the beam splitter 3, advance virtually in the same direction. Then, they are deflected by a rotating polygonal mirror 11 and passed through a scanning lens 12 so as to make parallel scanning on a scanned plane 9 as scanning lines 141 and 142.

The scanning beam detector 15 is for indicating the scan starting position for each beam scanning. Though not shown, output from this detector 15 is used as a sync. signal at the time when data for printing are delivered.

In this case, the distance d between the scanning lines 141 and 142 on the scanned plane 9 must be maintained at a suitable value corresponding to a predetermined pixel density (dot density). To achieve this, portions of incident beams $6_P$ and $6_S$ on the beam splitter 3 are taken out of it as beams for position control 101 and 102 and introduced into beam position detectors 111 and 112. The detectors 111 and 112, as shown in FIG. 9, are of the arrangement basically divided into two sections in the direction perpendicular to the scanning directions, and adapted such that the illumination power on each side of the boundary of the divisional area is photoelectrically converted and taken out as an electrical signal.

Then, the signals are supplied to differential amplifiers 221 and 222 so that differential signals are produced to be supplied to beam path conversion elements 211 and 212, whereby orientations of the mirrors $17_1$ and $17_2$ are adjusted so that the differential signals may be kept to zero at all times, and thus, the beams for control 101 and 102 can be steadily kept in positions of the respective boundary of divisional area of the detectors 111 and 112 in the center.

It is the characteristics of the present configuration that the above-described ¼ wavelength plates $2_P$ and $2_S$ are inserted into the beam paths of the beams $6_P$ and $6_S$ that are incident to the beam splitter 3, and that the above-described ¼ wavelength plate 99 is inserted into the beam paths of the beams after they have been amalgamated. By this arrangement, it is possible to realize a laser beam printer which can easily control the distance of the sub-scanning directions and which can perform a laser beam scanning without any difference in the intensities of two scanning beams.

Figure 9:
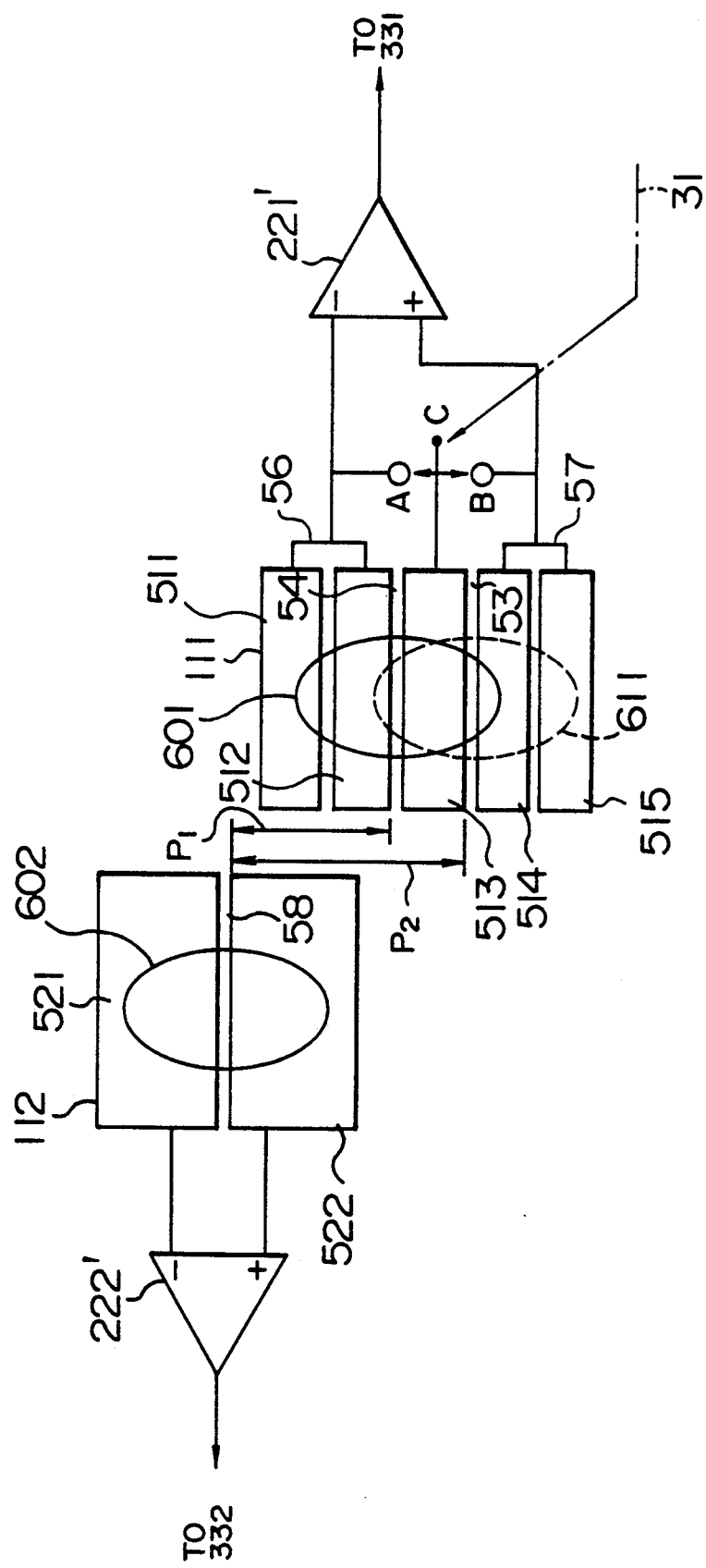
FIG. 9 shows a configuration of the light detector for detecting a beam positional distance included in the laser printer in FIG. 8.
Figure 10:
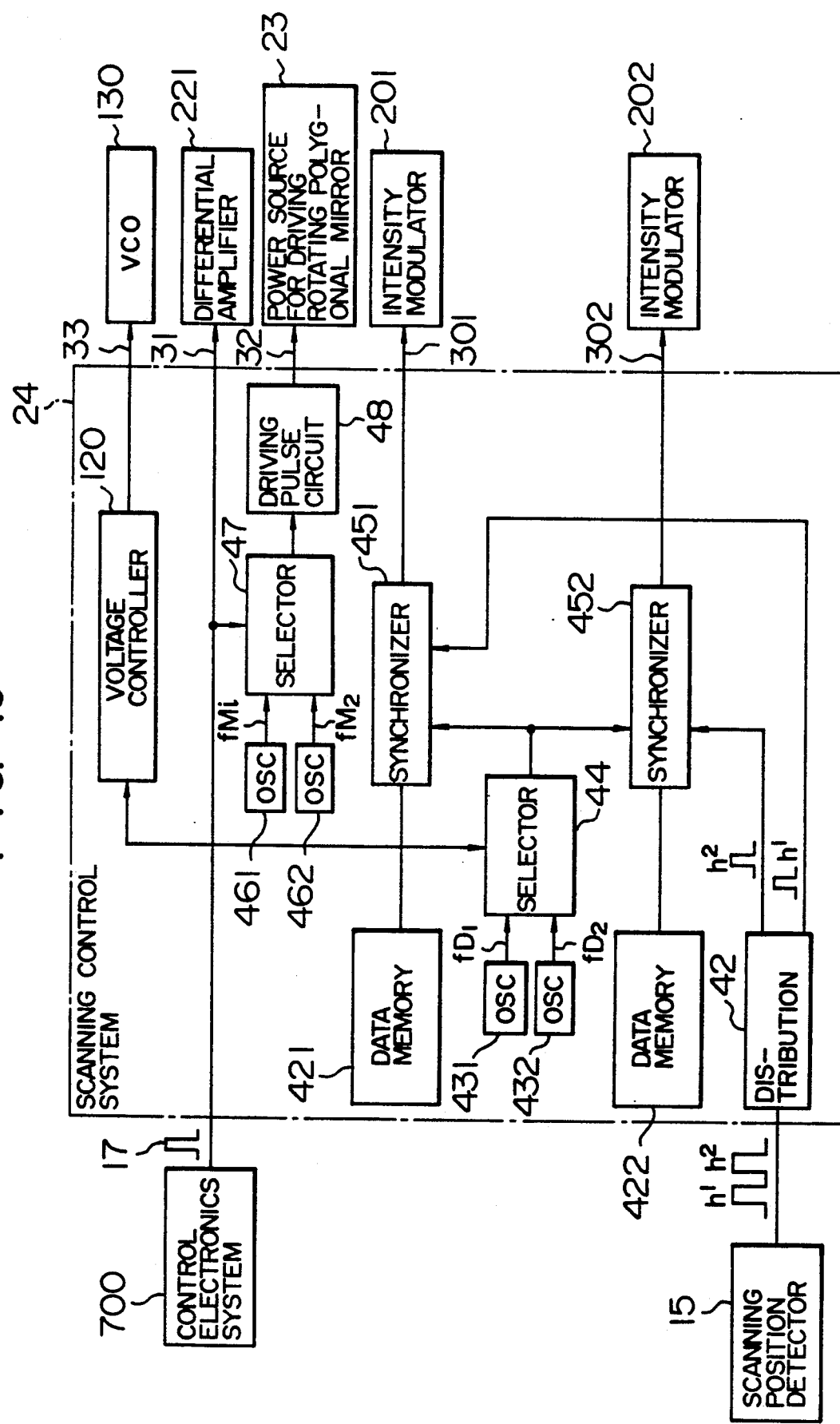
FIG. 10 shows a configuration of the scanning control unit in the laser printer in FIG. 8.

FIG. 9 shows an example of the detailed configuration of the light detector 10 for detecting a spot distance to control the above-described spot distance, and FIG. 10 shows an example of the configuration of the scanning control system 24 for operating the scanning optical system. Now, when a moving speed of the scanned plane 9, i.e., the rotational speed of the photo-sensitive drum, is keep constant, operations for changing pixel density both in the beam scanning direction and in the direction (sub-scanning direction) perpendicular thereto will be considered in the following.

First, in the scanning direction, the change in pixel density is achieved by adjusting the pulse width for beam intensity modulation on the pixel signal, thereby changing the exposed area. Signals 301 and 302 therefor are delivered from the scanning control system 24 to the beam intensity modulators 201 and 202. At this time, either of oscillation frequencies $fD_1$ and $fD_2$ from oscillators 430 and 432 is selected by a selector 44 in response to the dot density change command 17. Then, data for printing from data memories 421 and 422 are delivered, at the selected frequencies, to their respective beam intensity modulators 201 and 202, whereby the laser beams are turned on/off at prescribed rates.

In order to change the pixel density in the direction (sub-scanning direction) perpendicular to the scanning direction, the number of revolutions of the rotating polygonal mirror 11 for delfecting the beams of light must be changed. To achieve this, either of frequencies $fM_1$ and $fM_2$ for driving the rotating polygonal mirror is selected by a selector 47 within the scanning control system 24 in response to the dot density change command 17, and this selected frequency is passed through a driving pulse circuit 48. Therein, a clock pulse for controlling the rotating speed is generated to operate a rotational polygonal mirror motor driver 23 so that a suitable rotating speed is obtained to attain a prescribed number of scans.

When a plurality of beams, two beams 141 and 142, perform scanning at the same time, the distance d between the plural scanning beams must be changed by the amount corresponding to the change in the pixel density. This is achieved by moving the boundary of the divisional area (between 53 and 54, shown in FIG. 9) of one detector 111 of those for detecting beam position in accordance with the distance between the scanning beams.

The above mentioned operation is also performed through the scanning control system 24 in response to the dot density change command 17. A detector system to perform the operation will be explained based on FIG. 9. Illustrated in FIG. 9 is the case where the distance d between beams is varied in two ways.

The detector 111 is for the beam 101 and detects the position of its spot 601. The detector 111 is constructed of, for example, five divisions of photodetecting elements 511 to 515. Of these elements, 511 and 512 as well as 514 and 515 are respectively electrically coupled through lead wires 56 and 57, which in turn are coupled with a differential amplifier 221'. Meanwhile, the terminal C of a lead wire of the photodetecting element 513 is adapted to be selectively connected to either A or B according to a signal 31 from the scanning control system 24. When C is connected with A, the detector 111 functions as a divided-in-two detector with the boundary of divisional area 53 serving as the dividing line. By servo control corresponding to the differential signal provided at this time, the beam spot comes to a stabilized state when it is positioned as shown by dotted line 611 on the detector 111 in FIG. 9.

Meanwhile, as to the detector 112 being formed of divided-in-two-photodetecting elements 521 and 522, the beam spot 602 is stabilized thereon when it has the boundary of divisional area 58 in its center. At this time, the distance between the boundaries of divisional area 53 and 58 of the two detectors (111 and 112) is $P_2$, and corresponding to this value, the distance d between the scanning beams 141 and 142 on the scanned plane 9 is determined. Then, when C is connected with B in response to the signal 31 from the scanning control system 24, the detector 111 functions as a divided-in-two detector having the boundary of divisional area 54 as the dividing line. The beam spot is now stabilized at the position 601 by the servo control dependent on the differential signal at this time. Then, the distance between the two beam spots becomes $P_1$, corresponding to which, the beam distance d on the scanned plane 9 can take another value.

As described above, it is possible to change dot density by changing the spacing between the scanning lines even in the scanning optical system which uses two beams. However, in order to perform printing of higher picture quality, it is necessary to change the laser spot diameter in the sub scanning direction by a suitable value as well as to adjust the spacing of the scanning lines. The dynamic diffraction grating 18 shown in FIG. 8 is inserted. The dynamic diffraction grating 8 is equipped with a transistor for generating an ultrasonic wave. When a compressed pattern is to be printed, for example, the spot diameters of the two scanning laser beams 141 and 142 and the inter-scanning line distance are set to have almost a suitable relation to perform the printing. In this case, the dynamic diffraction grating 18 is not operated and only the 0-th beam is used without generating the ± first order beams.

When an expanded pattern is to be printed, the spot diameters in the sub-scanning directions are expanded respectively in relation to the expansion of the distance d between the scanning lines. In this case, an ultrasonic wave is generated by applying a suitable high frequency to the dynamic diffraction grating 18 and the spot diameters of the laser beams from the polarization prism 3 can be expanded by generating the ± first order beams to the laser beams.

Reference is requested to be made to the specification of the U.S. Ser. No. 07/501879, the "Variable Density Scanning Apparatus" proposed by the present applicant, which describes further details relating to the above-described control of the distance d between the scanning lines 141 and 142 on the scanned plane 9, conversion control of the dot densities and control of the spot diameters.

As described above in detail, according to the present invention, in a laser beam scanning apparatus including two semiconductor laser beam sources of approximately the same wavelengths, a scanning lens and a rotational polygonal mirror whereby to draw two scanning lines at the same time, it is possible to realize a laser beam scanning apparatus which further includes a prism for amalgamating two laser beams emitted from the two semiconductor laser beam sources in approximately the same direction and for having such characteristics that it passes a laser beam polarized in a specific direction but reflects a laser beam polarized in a direction orthogonal with this specific direction, and a ¼ wavelength plate inserted between the prism and the rotating polygonal mirror, whereby the apparatus eliminates a difference of reflection factors between two amalgamated laser beams which is generated when the beams are introduced to the rotating polygonal mirror so that the amalgamated laser beams of a uniform intensity can be obtained.

We claim:

1. A laser beam scanning apparatus comprising: two semiconductor laser beam sources of approximately the same wavelengths; a scanning lens; and a rotational polygonal mirror, whereby to draw two scanning lines; said apparatus further including a prism for amalgamating two laser beams emitted from said semiconductor laser beam sources in approximately the same directions and for having such characteristics that it passes a laser beam polarized in a specific direction but reflects a laser beam polarized in a direction orthogonal with said specific direction, and a ¼ wavelength plate inserted between said prism and said rotating polygonal mirror.

2. A laser beam scanning apparatus according to claim 1, wherein said laser beam scanning apparatus further includes: a light detector for monitoring a distance between scanning lines in sub-scanning directions of said laser beams; a control unit; a beam polarizer to be controlled by said control unit; and a ½ wavelength plate inserted between said laser beam sources and said prism.

3. A laser beam apparatus, comprising:
   first and second laser beam emitters for emitting a laser beam polarized in a specific direction and a laser beam polarized in a direction orthogonal with said specific direction, respectively;
   prism means which has such characteristics that it passes a laser beam emitted from said first laser beam emitter but reflects a laser beam emitted from said second laser beam emitter and which amalgamates two laser beams emitted from said first and second laser beam emitters in approximately the same direction;
   polarization means for scanning, at the same time on a scanned plane, two laser beams amalgamated by said prism means; and
   ¼ wavelength plate means inserted between said polarization means and said prism means to convert a laser beam from said prism means from a linearly polarized state to a circularly polarized state.

4. A laser beam apparatus, comprising:
   first and second laser beam emitters for emitting a laser beam polarized in a specific direction and a laser beam polarized in a direction orthogonal with said specific direction, respectively;
   prism means which has such characteristics that it passes a laser beam emitted from said first laser beam emitter but reflects a laser beam emitted from said second laser beam emitter and which amalgamates two laser beams emitted from said first and second laser beam emitters in approximately the same direction;
   polarization means for scanning, at the same time on a scanned plane, two laser beams amalgamated by said prism means;
   a ¼ wavelength plate inserted between said polarization means and said prism means;
   first and second ½ wavelength plates inserted between said prism means and said first laser beam emitter and between said prism means and said second laser beam emitter, respectively; and
   light detecting means for receiving from said prism means parts of laser beams received through said first and second ½ wavelength plates, respectively, and for controlling the distance between said laser beams in sub-scanning directions.

5. A laser beam scanning apparatus, comprising:
   a first laser beam emitter for emitting a laser beam polarized in a specific direction;
   a second laser beam emitter for emitting a laser beam polarize in a direction orthogonal with said specific direction of a laser beam emitted from said first laser beam emitter;
   prism means which has such characteristics that it passes a laser beam polarized in a specific direction from said first laser beam generator but reflects a laser beam emitted from said second laser beam generator and polarized in a direction orthogonal with said specific direction and which amalgamates two laser beams emitted from said first and second laser beam emitters in approximately the same direction;
   polarization means for scanning, at the same time on a scanned plane, two laser beams amalgamated by said prism means; and
   ¼ wavelength plate means inserted between said polarization means and said prism means to convert a laser beam from said prism means from a linearly polarized state to a circularly polarized state.

6. A laser beam scanning apparatus, comprising:
   a first laser beam emitter for emitting a laser beam polarized in a specific direction;
   a second laser beam emitter for emitting a laser beam polarized in a direction orthogonal with said specific direction of a laser beam emitted from said first laser beam emitter;
   prism means which has such characteristics that it passes a laser beam polarized in a specific direction from said first laser beam generator but reflects a laser beam emitted from said second laser beam generator and polarized in a direction orthogonal with said specific direction and which amalgamates two laser beams emitted from said first and second laser beam emitters in approximately the same direction;
   polarization means for scanning, at the same time on a scanned plane, two laser beams amalgamated by said prism means;
   ¼ wavelength plate means inserted between said polarization means and said prism means to convert a laser beam from said prism means from a linearly polarized state to a circularly polarized state;
   first ½ wavelength plate means inserted between said prism means and said first laser beam emitter to change a laser beam emitted from said first laser beam emitter to a linearly polarized beam which is inclined by a first predetermined angle;

second ½ wavelength plate means inserted between said prism means and said second laser beam generator to change a laser beam emitted from said second laser beam emitter to a linearly polarized beam which is inclined by a second predetermined angle; and light detecting means for receiving from said prism means parts of laser beams received through said first and second ½ wavelength plate means respectively and for controlling the distance between said laser beams in sub-scanning directions.

* * * * *